United States Patent Office.

A. VAN CAMP, OF WASHINGTON, DISTRICT OF COLUMBIA.

Letters Patent No. 87,733, dated March 9, 1869.

IMPROVED COMPOSITION FOR RECUTTING FILES AND RASPS.

The Schedule referred to in these Letters Patent and making part of the same.

Be it known that I, A. VAN CAMP, of the city of Washington, District of Columbia, have invented a Composition for Recutting Files and Rasps; and I hereby declare the following to be a full and exact description of the same.

The nature of the invention consists in treating old or worn-out files with chemicals, as herein described, so that they are restored.

The following description will enable any one to use my invention.

I put the files in a strong solution of sal-soda or concentrated lye, and brush them until perfectly clean. I then put them in a wooden trough or box, and cover them with warm water, say one pint. To this, I add three ounces, each, of alum or biborate of soda and sulphate of copper, finely pulverized, and well mixed, and stirred with the files. I then add six ounces sulphuric acid and one ounce of muriatic acid; then one ounce vinegar. The files remain in this preparation from ten to twenty minutes. They are then taken out, and well brushed, with a hard brush, in warm water. I then place the files in a solution of prepared chalk and water, made to the consistency of cream. After remaining in that twenty minutes, they are taken out, and well brushed, in clean water. After being quickly and perfectly dried, they must be well oiled with an equal part of glycerine and olive-oil, and put up, in hardware-paper, separately.

I have specified what I regard as the best preparation, but do not limit myself to it.

Other acids, sulphates, and preparations of soda, may also be used, but those mentioned are sufficient for the purpose.

The sulphates and soda partly neutralize and regulate the acids. The acids cut the files. The chalk and oil neutralize entirely the effect of acids, and prevent rust.

Having described my invention,

What I claim, and desire to secure by Letters Patent of the United States, is—

1. The combination of processes, herein described, for recutting files.

2. Combination of acids and sulphates, and other ingredients herein mentioned, for recutting files.

In testimony whereof, I have signed my name to this specification, in the presence of two subscribing witnesses.

A. VAN CAMP.

Witnesses:
    EDWIN JAMES,
    W. B. FRISBY.